United States Patent [19]

Higashitsutsumi

[11] Patent Number: 5,089,894
[45] Date of Patent: Feb. 18, 1992

[54] SOLID IMAGE PICKUP APPARATUS FOR ELIMINATING SMEAR

[75] Inventor: Yoshihito Higashitsutsumi, Motosu, Japan

[73] Assignee: Sanyo Electric Co., Ltd., Moriguchi, Japan

[21] Appl. No.: 520,798

[22] Filed: May 8, 1990

[30] Foreign Application Priority Data

May 15, 1989 [JP] Japan .................................. 1-120908

[51] Int. Cl.$^5$ ............................................ H04N 5/335
[52] U.S. Cl. ......................... 358/213.24; 358/213.26; 358/213.11
[58] Field of Search .............. 358/209, 213.11, 213.17, 358/213.24, 213.26, 213.27

[56] References Cited

U.S. PATENT DOCUMENTS

| | | | |
|---|---|---|---|
| 4,010,319 | 3/1977 | Levine | 358/213.2 X |
| 4,032,976 | 6/1977 | Levine | 358/213.2 X |
| 4,490,744 | 12/1984 | Levine | 358/213.2 X |
| 4,496,982 | 1/1985 | Levine | 358/213.16 |
| 4,547,807 | 10/1985 | Mitani | 358/213.2 X |
| 4,581,651 | 4/1986 | Hiyata et al. | 358/213.2 X |

FOREIGN PATENT DOCUMENTS

1192999 9/1985 Canada .
60-217764 10/1985 Japan .

Primary Examiner—Victor R. Kostak
Assistant Examiner—Tuan V. Ho
Attorney, Agent, or Firm—Fish & Richardson

[57] ABSTRACT

Solid image pickup elements are used in televison cameras, for example. A solid image pickup element is capable of receiving light and generating a picture signal corresponding to the light. For this purpose, the solid image pickup element has a picture area formed of photoelectric converters arranged in a two-dimensional matrix and generated information charges corresponding to light incident on the picture area. The information charges obtained at the picture area are transferred to and stored in the store area, vertical column by vertical column. At that time, the charges more than the number of the vertical photoelectric converters of the picture area are transferred to the store area. The transfer in the absence of the corresponding photoelectric converters is thereby performed so that the smear charges are stored in the store area. With this information of the smear charges being stored, the smear charges are eliminated from the information charges.

8 Claims, 6 Drawing Sheets

SOLID IMAGE PICKUP APPARATUS FOR ELIMINATING SMEAR

BACKGROUND OF THE INVENTION

1. Field of the Invention

This invention relates to an apparatus for eliminating a smear charge generated with a solid image pickup element of frame transfer type.

2. Description of the Related Art

A CCD solid image pickup element for use in a television camera, for example, receives light by a plurality of photoelectric converters arranged in a matrix, stores picture charges (information charges), and transfers the picture charges vertically and horizontally, thus outputting successive picture signals screen by screen.

Figure 7A:
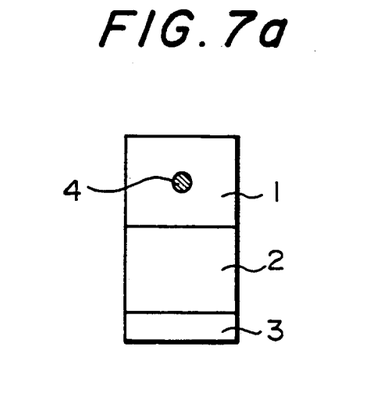
FIGS. 7(a) and 7(b) are schematic plan views each showing a solid image pickup element of frame transfer type.
Figure 7B:
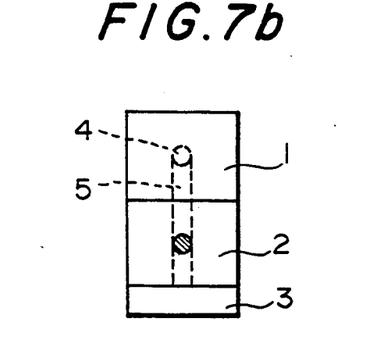

FIGS. 7(a) and 7(b) of the accompanying drawings are diagrams each showing a CCD solid image pickup element of frame transfer type. The frame transfer type CCD comprises a picture area 1 in which a plurality of photoelectric converters are arranged in a matrix, a store area 2 in which a plurality of vertical registers are arranged in association to the columns of the picture area, and a horizontal register 3. The picture charges generated in the picture area 1 by the photoelectric conversion are temporarily transferred to the store area 2 screen by screen, and are then outputted from the store area 2 horizontal line by horizontal line via the horizontal register 3.

Figure 8:
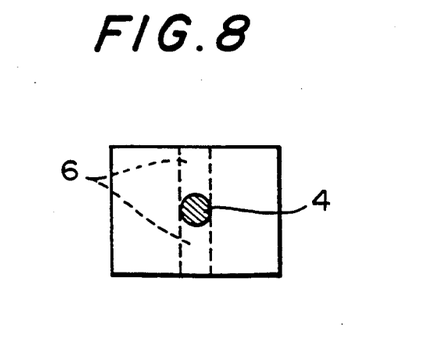
FIG. 8 is a schematic view showing a reproduced screen in which a smear is produced.

In such solid image pickup element, as shown in FIG. 7(a), if a strong spotlight 4 is irradiated on a portion of the picture area 1, a smear charge due to the spotlight 4 is superposed over the picture charges as the picture charges are transferred from the picture area 1 to the store area 2. Therefore, as shown in FIG. 7(b), permeation of light and thus a smear is produced in the area 5 which has the picture charges having passed the area irradiated by the spotlight 4. Consequently, as shown in FIG. 8, a smear 6 with respect to the spotlight 4 would be developed vertically in a reproduced picture.

In the solid image pickup element of frame transfer type in which the picture charges are transferred in the picture area normally irradiated by light, the above-discussed smear would be produced. To this end, a circuit for minimizing the production of such smear is disclosed such as in Japanese Patent Publication No. 35067/1981.

Figure 9:
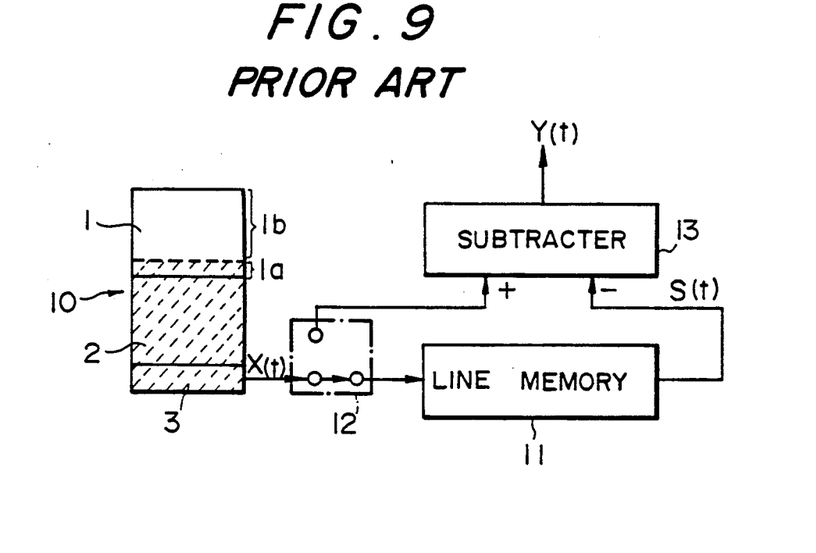
FIG. 9 is a block diagram showing a conventional solid image pickup apparatus for eliminating a smear.

FIG. 9 is a block diagram showing a circuit for minimizing smear charges. In the CCD solid image pickup element 10 of FIG. 9, from one to several lowermost horizontal lines 1a of the picture area 1, in addition to the store area 2 and the horizontal register 3, are shielded off light, and the remaining portion 1b of the picture area 1 receives light. A multiphase drive clock is supplied to the solid image pickup element 10, and the picture charges obtained by the picture area 1 are outputted horizontal line by horizontal line from the store area 2 via the horizontal register 3.

Figure 10:
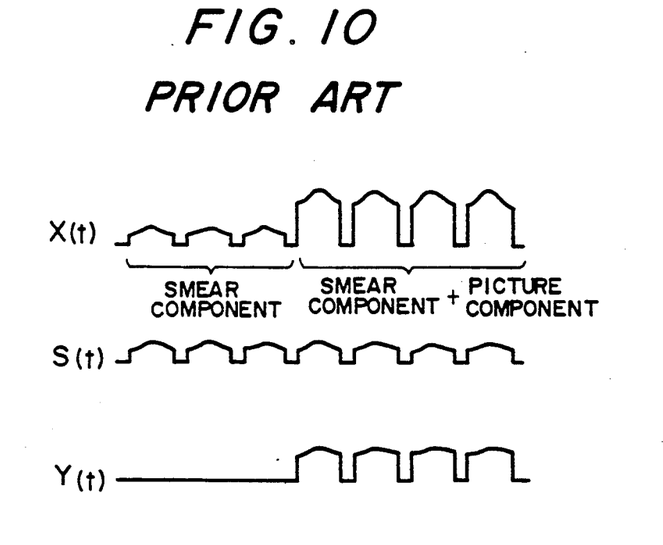
FIG. 10 is a diagram showing waveforms of various signals.

A line memory 11 is connected to the output of the solid image pickup element 10 via a switch 12, and only signals which correspond to the charges stored in the horizontal lines 1a of the picture area 1 as shaded off light are stored by shifting the switch 12. In the shaded horizontal lines 1a, since light is not irradiated during taking a picture, only smear charges are stored. Thus picture signals X(t) obtained from the solid image pickup element 10 comprise a first kind of signals each including a picture component and a smear component, and a second kind of signals each including only a smear component, as shown in FIG. 10. At the timing of outputting the signals including only smear components, the switch 12 is shifted so as to fetch the picture signals X(t) in a line memory 11 for one horizontal line to store the smear charge signals in the line memory 11. From the line memory 11, as shown in FIG. 10, the smear charge signals S(t) are read in synchronism with the picture signals.

The output of the solid image pickup member 10 is connected to the positive input side of a subtracter 13, and the output of the line memory 11 is connected to the negative input side of the subtracter 13. When the picture signals X(t) each including a picture component and a smear component are inputted from the solid image pickup element 10, and when the smear charge signals S(t) including only smear components are inputted from the line memory 11, the smear charge signals S(t) is subtracted from the picture signals X(t). Thus the picture signals Y(t) which do not include any smear component, as shown in FIG. 8.

In this smear eliminating method, because any smear component of the picture signal is detected and subtracted screen by screen, precise detection of the smear components is necessary. Instead, the lowermost portion of the picture area 1 of the solid image pickup element 10 is shaded off light, and the charges stored in this shaded area 1a are employed in detecting any smear component.

However, in the solid image pickup element of frame transfer type in which vertical picture elements can be inadequately separated, even when the lowermost portion of the picture area 1 is shaded off light, there is the possibility that some charges permeate from the unshaded area 1b into the shaded area 1a. Thus charges are stored in the shaded area 1a particularly near the border to the unshaded area 1b. Specifically, the general solid image pickup element of frame transfer has a channel stop area which separates the picture elements vertically and separates the picture elements by a potential fence formed by a transfer electrode, so that it cannot be guaranteed that the charges created at the deep of the substrate are stored exactly in predetermined picture elements. Since the quantity of charges stored in the shaded area is more than the quantity of the original smear, accurate detection of the smear components is difficult to achieve.

When the detection of the smear components is inaccurate, elimination of the smear is inadequate so that the picture signals are deteriorated to degraded the quality of a reproduction screen.

If the shaded area 1a is wide, it is possible to prevent permeation of the charges; but, since the effective area of the picture area 1 is small, the shaded area 1a cannot be so large.

SUMMARY OF THE INVENTION

It is therefore an object of this invention to provide a solid image pickup apparatus, for eliminating a smear, in which smear components can be exactly subtracted from information charge signals to thereby realize a good quality reproduction screen.

According to this invention, there is provided a solid image pickup apparatus for eliminating a smear, comprising: a picture area formed of a plurality of photoelectric converters which are arranged in a two-dimensional matrix and create information charges according to light incident on the photoelectric converters; a store area formed of a plurality of vertical registers which are arranged in association with respective columns of the picture area; first transfer means for transferring, to the vertical registers corresponding to the store area at each column of the picture area, the information charges created in the respective photoelectric converters of the picture area and for transferring, to the store area, smear charges by the transfer of charges, in the absence of the photoelectric converters corresponding to the picture area, by transferring charges more than the number of the photoelectric converters creating the information charges at the columns of the picture area; a horizontal register corresponding to one horizontal line of the store area; second transfer means for transferring the stored charges of the store area; third transfer means for outputting a charge signal corresponding to the charges stored in the horizontal register; storage means for fetching and storing a smear charge signal of one line when the charge signal of the one line transferred by the third transfer means is the smear charge signal; and subtracter means to which the information charge signal outputted from the horizontal register by the third transfer means and the smear charge signal read from the store means are to be inputted, the subtracter means being capable of performing a subtraction between the inputted two signals.

With the solid image pickup apparatus of this invention, since the horizontal lines excessively transferred from the picture area to the store area are irradiated with light only when being transferred vertically across the picture area, only the charges created during that time, and thus only the smear charges are stored so that accurate smear charge signals can be obtained from these lines to subtract the smear charge signals from the information charge signal, thereby eliminating the smear of the information charge signals.

The above and other advantages, features and additional objects of this invention will be manifest to those versed in the art upon making reference to the following detailed description and the accompanying drawings in which two preferred structural embodiments incorporating the principles of this invention are shown by way of illustrative example.

DETAILED DESCRIPTION

Figure 2:
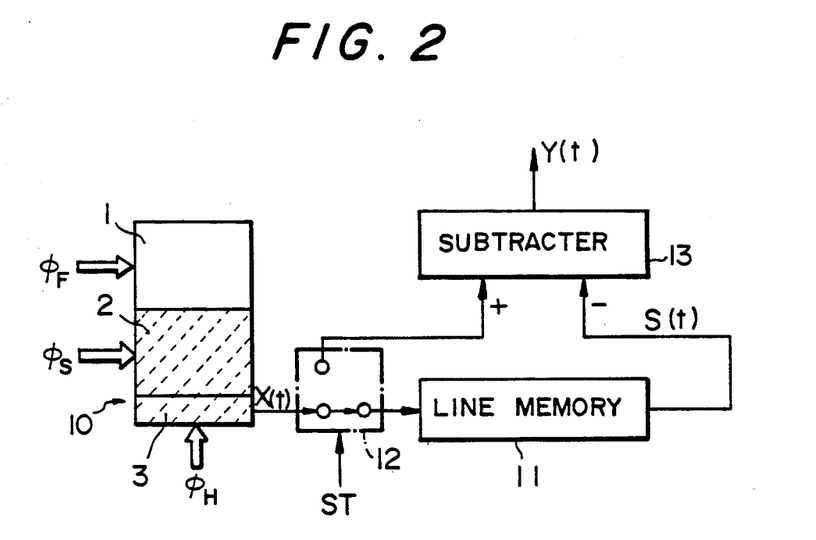
FIGS. 2 and 4 are block diagrams of the apparatus of FIG. 1.
Figure 4:
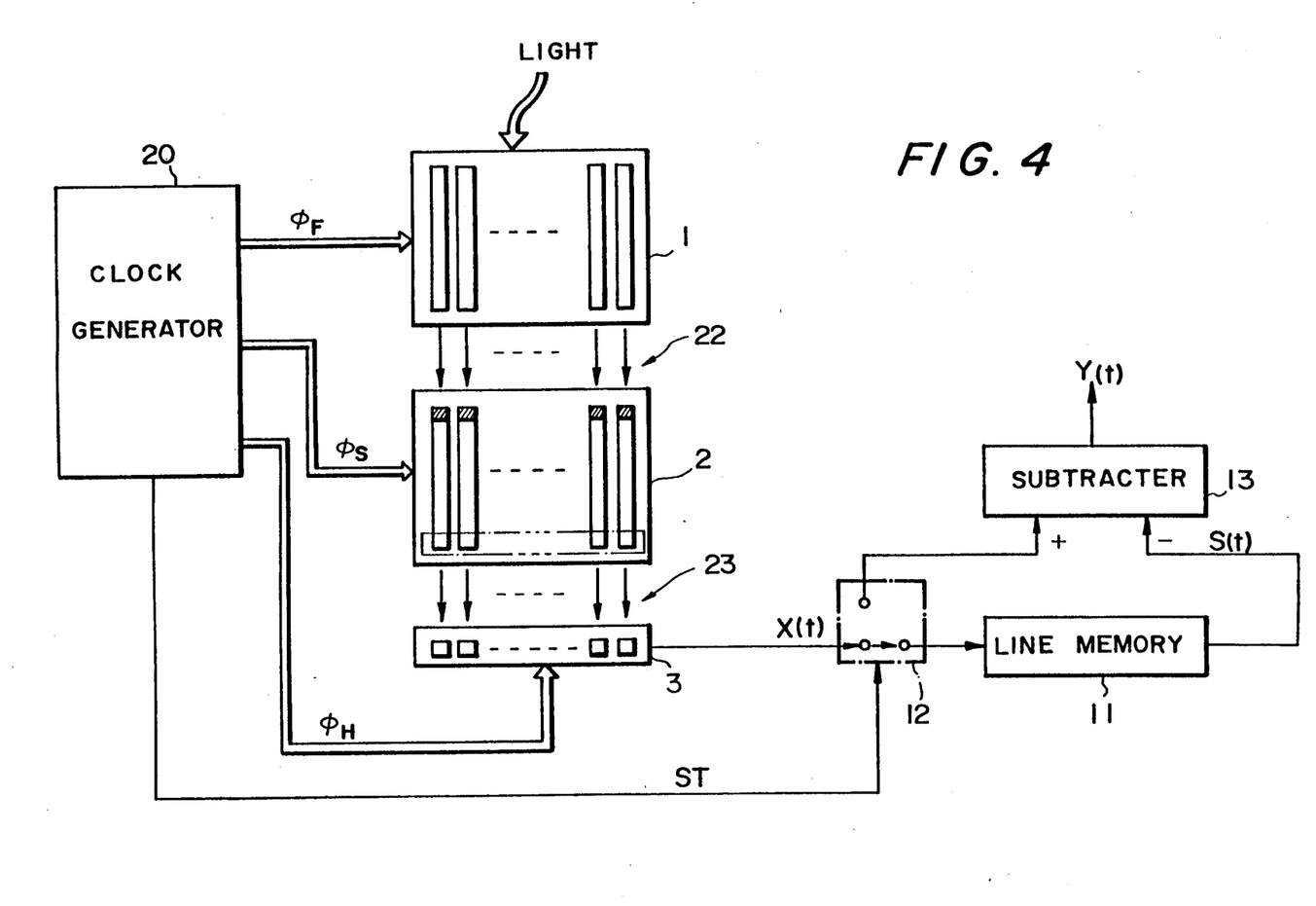

The principles of this invention are particularly useful when embodied in a solid image pickup apparatus (hereinafter called "apparatus"), for eliminating a smear, such as shown in FIGS. 2 and 4.

Figure 1:
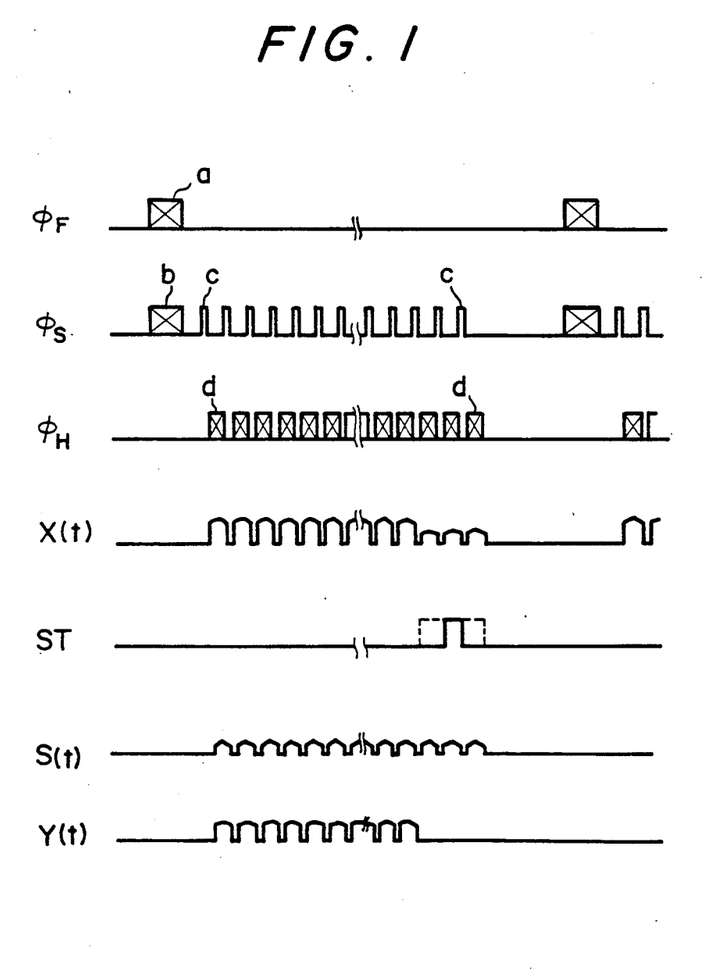
FIG. 1 is a timing diagram showing a solid image pickup apparatus, for eliminating a smear, embodying this invention.

FIG. 1 is a timing diagram showing the operation of the apparatus, and FIG. 2 is a block diagram similar to FIG. 9, showing the structure of the apparatus.

As shown in FIG. 2, the apparatus generally comprises a solid image pickup element 10, a line memory 11, a subtracter 13 and a switch 12. The solid image pickup element 10 is formed of a plurality of photoelectric converters arranged in a matrix, comprising a picture area 1, a store area 2, and a horizontal register 3; the store area 2 and the horizontal register 3 are shaded off light, while the picture area 1 is not shaded for storing information charges.

A transfer clock $\phi_F$ for transferring picture charges to the store area 2 screen by screen is supplied to the picture area 1, while a transfer clock $\phi_S$ for transferring picture charges to the horizontal register 3 horizontal line by horizontal line is supplied to the store area 2. In addition, a transfer clock $\phi_H$ for transferring and outputting picture charges, transferred from the store area 2 horizontal line by horizontal line, is supplied to the horizontal register 3, and then a picture signal X(t) is outputted from the horizontal register 3.

Figure 3:
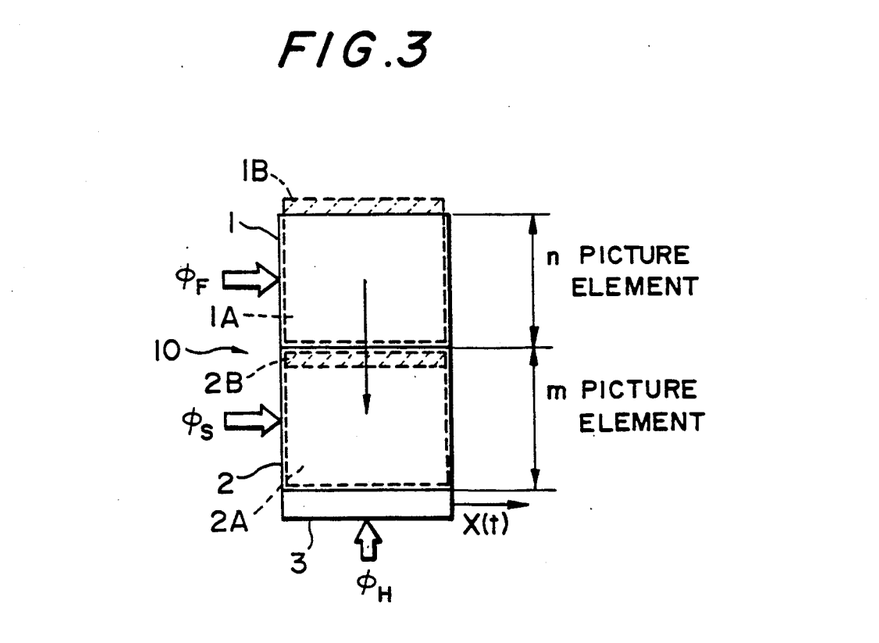
FIGS. 3 and 5 are schematic views showing the manner in which information charges are transferred in the apparatus.

The transfer clock $\phi_F$ is composed of a succession of clock pulses a corresponding to each vertical scanning duration 1V of the solid image pickup element 10. The number of the clock pulses a is set so as to be lightly more than the number of vertical picture elements of the picture area 1. Namely, the picture charges of the picture area 1 are transferred one picture element vertically by one pulse; after the picture charges have been completely transferred from the picture area 1 to the store area 2, several more picture elements (e.g., three more picture elements) are transferred. Therefore, as shown in FIG. 3, in the store are 2, a charge pattern 2B from an imaginary area 1B outside the picture area 1A as well as a picture charge pattern 2A obtained at the picture area 1A are stored. Here the number of vertical picture elements m of the store area 2 is set so as to be more than the number of vertical picture elements n of the picture area 1 by the number of additional picture elements (e.g., three picture elements) for transferring excessive information charges. Therefore the charge pattern of the store area 2 includes smear components, in addition to picture information components obtained picture area 1A, while the charge pattern 2B includes the charge components stored only during transferring across the picture area 1, namely, only the smear components.

Further, the transfer clock $\phi_S$ includes clock pulses b corresponding to the clock pulses of the transfer clock $\phi_F$, and also clock pulses c for transferring the picture charges to the horizontal register 3 horizontal line by horizontal line. The transfer clock $\phi_H$ to be supplied to the horizontal register 3 includes clock pulses d corresponding to the respective clock pulses c of the transfer clock $\phi_S$, and transfers and outputs the information charges horizontal line by horizontal line.

Accordingly, the charge signals X(t) outputted from the horizontal register 3 repeat alternately a signal indicating the information charges for one screen and a signal indicating the smear charges for several lines.

A shift control signal ST which will be a high level, only during the horizontal scanning while the signal indicating the smear information is being outputted, is supplied to the switch 12 to fetch the charge signals X(t) in the line memory 11 while the shift control signal ST is high level. Therefore the smear charge signals S(t) for one horizontal line selected by the switch 12 are stored in the line memory 11.

Thereafter, at the subtracter, likewise as shown in FIGS. 7(a) and 7(b), the smear charge signals S(t) are subtracted from the charge signals X(t) to obtain an information charge signal Y(t) devoid of any smear component.

In the illustrated embodiment, the number of picture elements for one horizontal line is recognized in the subtracter 13, and the signals regarding the smear charges in the charge signal X(t) are eliminated from the information charge signal Y(t).

FIG. 4 is a block diagram showing the traveling of the signals in this invention. The signals $\phi_F$, $\phi_S$, $\phi_H$, ST are produced by a clock generator 20. The clock generator 20 generates individual signals from predetermined reference clocks. The frequency of generation of the signals a of the signal $\phi_F$ corresponds to a vertical synchronous signal, while the frequency of generation of the signals c of the signal $\phi_S$ corresponds to a horizontal synchronous signal.

A first transfer means 22 utilizes the individual photoelectric converters of the picture area 1 as shift registers. In the first transfer means 22, the charges stored in the individual photoelectric converters of the picture area 1 are transferred to the corresponding vertical registers of the store area 2 successively in accordance with the quick transfer clocks of several MHz of the signals a of the signal $\phi_F$ by shifting the stored charges. This transfer for the individual columns is performed simultaneously.

A second transfer means 23, like the first transfer means 22, utilizes vertical registers as shift registers. In the second transfer means 23, the transfer is performed by shifting the stored charges of the store area 2 to the horizontal register 3 horizontal line by horizontal line in accordance with the signals c of the signal $\phi_S$.

A third transfer means performs the transfer by reading the stored charges of the horizontal register 3 as charge signals and by outputting them as serial signals.

Figure 5:
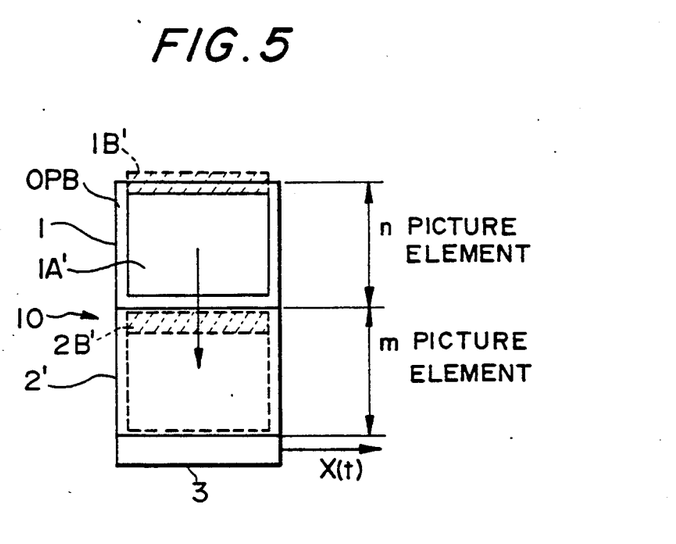

However, the usual solid image pickup element 10, as shown in FIG. 5, is equipped with an optical black area OPB surrounding the peripheral edge of the picture area 1. Consequently, assuming that the information charges of the picture area 1 are transferred more than the number of vertical picture elements n when the effective number of picture elements of the picture area 1 is less than the total number of picture elements of the picture area 1 and when the number of picture elements of the store area 2 is equal to that of the picture area 1, the charge pattern 2A' of the effective picture element area 1A' and the charge pattern 2B' of the imaginary area 1B' can be accommodated in the store area 2', if they are within the range of the number of picture elements of the OPB. It is therefore possible to adopt the apparatus of this invention, without the necessity that the number of vertical picture elements of the store area 2' be more than that of the picture area 1.

Figure 6:
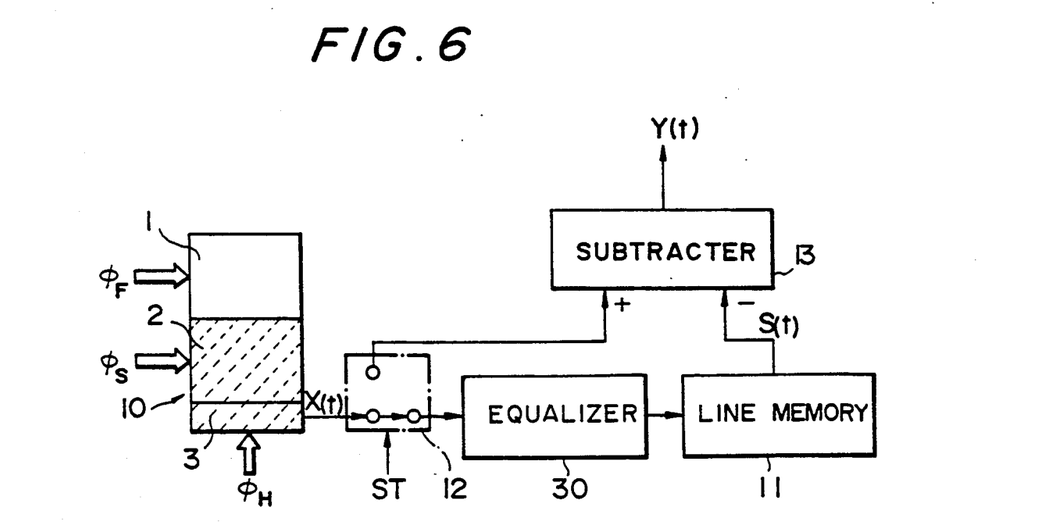
FIG. 6 is a view similar to FIG. 2, showing a modified apparatus according to another embodiment of this invention.

FIG. 6 shows another embodiment, in which an equalizer 30 is located between the switch 1 and the line memory 11. The shifting operation of the switch 12 is timed to the output duration of the smear charge signals for a plurality of lines as indicated by phantom lines in the signal ST of FIG. 1. Accordingly, the smear charge signals in the charge signals X(t) for a plurality of lines are transferred to the equalizer 30 where a mean value for one line is calculated. This means value is fetched by the line memory 11. Since the signals for several lines are equalized even though noises are superposed over the smear charge signals, it is possible to minimize the influence of the noises.

According to this invention, since the area for detecting a smear is the imaginary area assumed outside the picture area, there is no mixture of photoelectric charge from the picture area, it is possible to detect the amount of smear charges stored only while the charges are transferred vertically in the picture area. The smear components can accordingly subtracted from the information charge signals accurately to realizing a better quality reproduced display.

In addition, it is possible to detect any smear charge exactly by only changing the timing of operation of the solid image pickup element, without the necessity that the solid image pickup element per se has a special structure, thus guaranteeing an inexpensive apparatus.

What is claimed is:

1. A solid image pickup apparatus for eliminating a smear, comprising:
    (a) a picture area formed of a plurality of photoelectric converters which are arranged in a two-dimensional matrix and create information charges according to light incident on said photoelectric converters;
    (b) a store area formed of a plurality of vertical registers which are arranged in association with respective columns of said picture area;
    (c) first transfer means for transferring, to said vertical registers corresponding to said store area at each column of said picture area, said information charges created in the respective photoelectric converters of said picture area and for transferring, to said store area, smear charges by the transfer of charges, in the absence of said photoelectric converters corresponding to said picture area, by transferring more charges than the number of said photoelectric converters creating said information charges at said columns of said picture area;
    (d) a horizontal register corresponding to one horizontal line of said store area;
    (e) second transfer means for transferring the stored charges of said store area;
    (f) third transfer means for outputting a charge signal corresponding to the charges stored in said horizontal register;
    (g) storage means for fetching and storing a smear charge signal of one line when the charge signal of the one line transferred by said third transfer means is the smear charge signal; and
    (h) subtracter means to which the information charge signal outputted from said horizontal register by said third transfer means and the smear charge signal read from said storage means are to be inputted, said subtracter means being capable of performing a subtraction between the inputted two signals.

2. A solid image pickup apparatus according to claim 1, further comprising a switch for receiving the charge signal outputted by said third transfer means and for shifting the transfer of the received charge signal to one of said storage means and said subtracter means.

3. A solid image pickup apparatus according to claim 2, further including signal generator means for generating a signal to control said first transfer means, said second transfer means, said third transfer means and the shifting timing of said switch.

4. A solid image pickup apparatus according to claim 2, in which said first transfer means is capable of transferring the smear charges for several lines, and in which the smear charge signal of one line outputted by said third transfer means is stored in said storage means as selected by the shifting of said switch.

5. A solid image pickup apparatus according to claim 1, further including equalizer means located previously of said storage means, said first transfer means being capable of transferring the smear charges for several lines, said equalizer means being capable of equalizing the smear charge signals of several lines, the equalized smear charge signal of one line being stored in said storage means.

6. A solid image pickup apparatus according to claim 2, further including equalizer means located previously of said storage means, said first transfer means being capable of transferring the smear charges for several lines, said equalizer means being capable of equalizing the smear charge signals of several lines, the equalized smear charge signal of one line being stored in said storage means.

7. A solid image pickup apparatus according to claim 1, further including an optically black area surrounding said picture area.

8. A solid image pickup apparatus according to claim 7, in which the number of the vertical lines of said store area is equal to the number of said vertical photoelectric converters of said picture area including said optically black area.

* * * * *